United States Patent
Bailey

(10) Patent No.: US 11,334,302 B1
(45) Date of Patent: May 17, 2022

(54) METHODS AND SYSTEMS FOR INDICATING AND REPLACING MISSING ELEMENT(S) IN PRINT JOB FILES PRIOR TO PRINTING

(71) Applicant: Global Graphics Software Limited, Cambridge (GB)

(72) Inventor: Martin Bailey, Cambridgeshire (GB)

(73) Assignee: GLOBAL GRAPHICS SOFTWARE LIMITED, Cambridge (GB)

(*) Notice: Subject to any disclaimer, the term of this patent is extended or adjusted under 35 U.S.C. 154(b) by 0 days.

(21) Appl. No.: 17/380,465

(22) Filed: Jul. 20, 2021

(51) Int. Cl.
*G06F 3/12* (2006.01)
*G06K 15/02* (2006.01)

(52) U.S. Cl.
CPC .......... *G06F 3/1242* (2013.01); *G06F 3/1204* (2013.01); *G06F 3/1205* (2013.01); *G06F 3/1275* (2013.01); *G06K 15/1836* (2013.01); *G06K 15/1856* (2013.01)

(58) Field of Classification Search
CPC .... G06F 3/1242; G06F 3/1204; G06F 3/1205; G06F 3/1275; G06K 15/1836; G06K 15/1856
USPC ........................................................ 358/1.18
See application file for complete search history.

(56) References Cited

U.S. PATENT DOCUMENTS

| | | | |
|---|---|---|---|
| 8,780,127 B2 * | 7/2014 | Takeishi | G06K 15/1888 345/557 |
| 2017/0068875 A1 * | 3/2017 | Gerrits | G06K 15/1823 |

* cited by examiner

*Primary Examiner* — Neil R McLean
(74) *Attorney, Agent, or Firm* — Branch Partners PLLC; Bruce E. Black

(57) ABSTRACT

A method for processing a print job file using a printing system includes receiving, by the printing system, the print job file, the print job file including at least one placeholder element designated in the document using a pattern, a spot color, or a set of color values; receiving, by the printing system, missing content for the print job file; replacing, by the printing system, the at least one placeholder element with the missing content; and printing, by the printing system, the print job file including the missing content.

20 Claims, 3 Drawing Sheets

METHODS AND SYSTEMS FOR INDICATING AND REPLACING MISSING ELEMENT(S) IN PRINT JOB FILES PRIOR TO PRINTING

FIELD

The present invention is directed to the area of processing and printing print job files. The present invention is also directed to methods and systems for indicating and replacing missing element(s) in print job files.

BACKGROUND

Print job files are created by one or more applications and sent to printing software or a printer or press for printing. In many instances, there are items in the print job, such as graphics or the like, that are not known or are not accessible at the time that the initial print file or print job file is created. Revising the print job file to add these items can be time-consuming or difficult.

BRIEF SUMMARY

One embodiment is a method for processing a print job file using a printing system. The method includes receiving, by the printing system, the print job file, the print job file including at least one placeholder element designated in the document using a pattern, a spot color, or a set of color values; receiving, by the printing system, missing content for the print job file; replacing, by the printing system, the at least one placeholder element with the missing content; and printing, by the printing system, the print job file including the missing content.

Another embodiment is a printing system for processing a print job file. The printing system includes a printing device; and at least one processor coupled to the printing device and configured and arranged to perform actions. The actions include receiving, by the at least one processor, the print job file, the print job file including at least one placeholder element designated in the document using a pattern, a spot color, or a set of color values; receiving, by the at least one processor, missing content for the print job file; replacing, by the at least one processor, the at least one placeholder element with the missing content; and printing, by the printing device, the print job file including the missing content.

A further embodiment is a non-transitory computer-readable medium having processor-executable instructions for processing a print job file using a printing system, the processor-executable instructions when installed onto a device enable the device to perform actions. The actions include receiving, by the printing system, the print job file, the print job file including at least one placeholder element designated in the document using a pattern, a spot color, or a set of color values; receiving, by the printing system, missing content for the print job file; replacing, by the printing system, the at least one placeholder element with the missing content; and printing, by the printing system, the print job file including the missing content.

In at least some embodiments, the print job file and the missing content is received from the same source. In at least some embodiments, the missing content is received after the print job file.

In at least some embodiments, at least one of the at least one placeholder element is designated in the document using the pattern and the pattern is a shading pattern or a tiling pattern. In at least some embodiments, at least one of the at least one placeholder element is designated in the document using the spot color and the spot color has a predefined name or a name constructed using a predefined naming convention. In at least some embodiments, at least one of the at least one placeholder element is designated in the document using the set of color values which are not intended for printing as a color.

In at least some embodiments, replacing the at least one placeholder element includes replacing the at least one placeholder element in a prepress workflow prior to rendering in preparation for print. In at least some embodiments, the at least one placeholder element includes replacing the at least one placeholder element by a Digital Front End of the printing system or printing device. In at least some embodiments, the at least one placeholder element includes replacing the at least one placeholder element by a Raster Image Processor of the printing system or printing device.

In at least some embodiments, replacing the at least one placeholder element includes replacing the at least one placeholder element by supplying the missing content as a production pattern to be accessed by a procedure in the print job file. In at least some embodiments, the procedure is a PaintProc procedure.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention is directed to the area of processing and printing print job files. The present invention is also directed to methods and systems for indicating and replacing missing element(s) in print job files.

The methods, systems, and devices described herein may be embodied in many different forms and should not be construed as limited to the embodiments set forth herein. Accordingly, the methods, systems, and devices described herein may take the form of an entirely hardware embodiment, an entirely software embodiment or an embodiment combining software and hardware aspects. The following detailed description is, therefore, not to be taken in a limiting sense. The methods described herein can be performed using any type of processor and any suitable type of device that includes a processor.

Figure 1A:
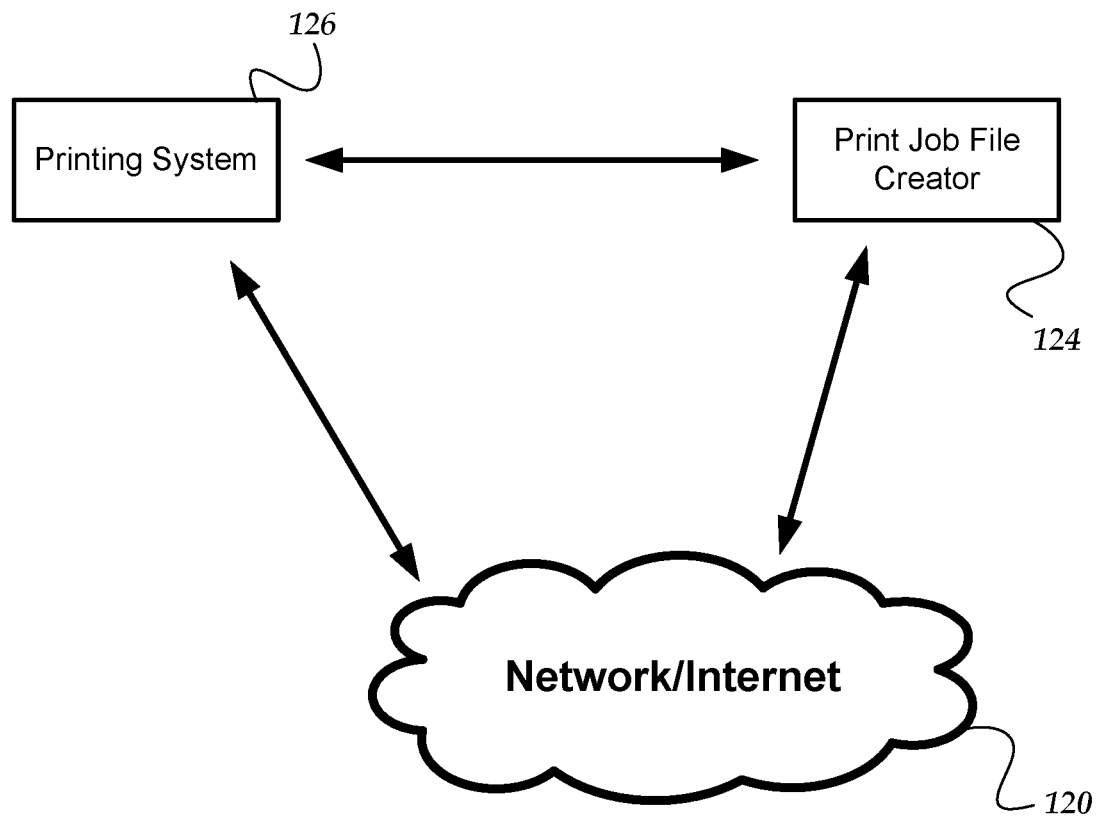
FIG. 1A is a schematic block diagram of one embodiment of an environment for practicing the invention.

FIG. 1A illustrates one embodiment of an environment which includes a network 120 (such as the Internet or any other local, private, or wide-area network or any combination thereof), a printing system 126 and a job file creator 124. Examples of connections between the elements are illustrated in FIG. 1A, but there may be more or fewer connections in any particular embodiment. The job file creator 124 can be any suitable source of print jobs, such as a computer, server, scanner, or the like or any combination thereof. The print job can be a single document or multiple documents and can include any combination of text, graphics, pictures, or the like for printing by the printing system 126. In at least some embodiments, the printing system 126 can also be a job file creator.

Systems referenced herein typically include memory and typically include methods for communication with other devices including mobile devices. Methods of communication can include both wired and wireless (e.g., RF, optical, or infrared) communications methods and such methods provide another type of computer readable media; namely communication media. Wired communication can include communication over a twisted pair, coaxial cable, fiber optics, wave guides, or the like, or any combination thereof. Wireless communication can include RF, infrared, acoustic, near field communication, Bluetooth™, or the like, or any combination thereof.

Figure 1B:
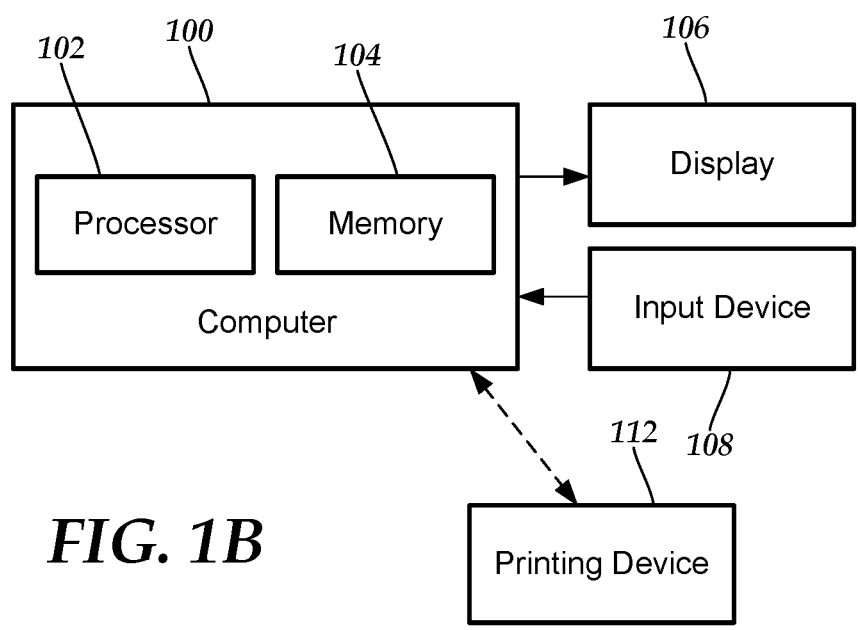
FIG. 1B is a schematic block diagram of one embodiment of a printing system for processing print job files, according to the invention.

FIG. 1B illustrates one embodiment of a printing system for practicing the invention. The printing system can include a computer 100 or any other device that includes a processor 102 and a memory 104, a display 106, an input device 108, and a printing device 112, such as a printer or press. The printing device 112 can be a digital press, a conventional press, an inkjet device, or any other suitable printing device. In some embodiments, one or more of the computer 100, display 106, or input device 108 can be part of the printing device 112.

The computer 100 can be a laptop computer, desktop computer, server computer, tablet, mobile device, smartphone, or other devices that can run applications or programs, or any other suitable device for processing information and for presenting a user interface. Alternatively or additionally, the computer 100 can be part of the printing device 112 or coupled (by wired or wireless coupling) to the printing device. The computer 100 can be local to the user or can include components that are non-local to the user including one or both of the processor 102 or memory 104 (or portions thereof). For example, in some embodiments, the user may operate a terminal that is connected to a non-local computer. In other embodiments, the memory can be non-local to the user.

The computer 100 can utilize any suitable processor 102 including one or more hardware processors that may be local to the user or non-local to the user or other components of the computer. The processor 102 is configured to execute instructions provided to the processor, as described below.

Any suitable memory 104 can be used for the computer 100. The memory 104 illustrates a type of computer-readable media, namely computer-readable storage media. Computer-readable storage media may include, but is not limited to, nonvolatile, non-transitory, removable, and non-removable media implemented in any method or technology for storage of information, such as computer readable instructions, data structures, program modules, or other data. Examples of computer-readable storage media include RAM, ROM, EEPROM, flash memory, or other memory technology, CD-ROM, digital versatile disks ("DVD") or other optical storage, magnetic cassettes, magnetic tape, magnetic disk storage or other magnetic storage devices, "in the cloud", or any other medium which can be used to store the desired information and which can be accessed by a computer.

The display 106 can be any suitable display device, such as a monitor, screen, display, or the like. The input device 108 can be, for example, a keyboard, mouse, touch screen, track ball, joystick, voice recognition system, or any combination thereof, or the like and can be used by the user to interact with a user interface.

Print job files are presented to the printing system 126 (FIG. 1A) for printing. In some circumstances, a print job file is missing one or more elements (for example, text, graphics, or the like or any combination thereof) that are not known, not accessible, or otherwise not present at the time that the print job file was created or modified or sent to the printing system 126 (FIG. 1A). These missing elements are incorporated into the print job file by the printing system prior to printing. Described herein are methods and systems for representing the missing element(s) in the print job file and for replacing that representation by the missing element(s) using the printing system.

The missing element(s) may be provided to the printing system with the print job file or separately from the print job file. The printing system then incorporates the missing elements into the print job file prior to printing. In particular, the printing system replaces placeholder elements in the print job file with the missing elements.

Examples of print job files, such as documents, and missing elements include, but are not limited to, documents with security features such as, for example, covert or overt anti-counterfeit marking(s), tracking or tracing information, a job or product identifier, or the like or any combination thereof. Elements (for example, information) that may be missing in the original print job file, but can be added during the printing process, also include, but are not limited to, the print job or document rendering time or date, the print job or document rendering location, batch or serial numbers, a customer's order number, customer name, a job name, a printer/converter/manufacturer's job number, or a product identifier (for example, a UPC or EAN product code), or the like or any combination thereof. In at least some embodiments, the missing elements or information may be presented overtly or covertly on the printed document. Other examples of print job files, such as documents, that can have missing information include marketing documents that may be revised to have varying marketing messages without the need for the overall design to be edited by a designer or documents with variable data such as competition entry codes or barcodes or the like or any combination thereof.

As described herein, one or more objects can be used in the print job file as a placeholder for the missing element(s). The object(s) can be replaced with the missing element(s) or information later. Examples of replaceable objects are regions in the document with a specified tiling pattern, shading pattern, spot color, or other color definition, such as a set of color values. The objects are replaced with the missing element(s) prior to printing the print job file.

The terminology and specific technical details around patterns, spot colors, and other color spaces or values, as used herein, is taken from the PostScript Language Reference Manual (PLRM), and the Portable Document Format (PDF) standard, which are very similar to each other with respect to these details and terminology. It will be understood, however, that the devices, systems, and methods described herein can also be used with any other page description language (PDL) that supports patterns, spot colors, or color values.

In PostScript and PDF there are several kinds of patterns. Tiling patterns will be used herein as an example, but it will be understood that shading patterns and other types of patterns can be used instead of, or in addition to, tiling patterns. Examples of tiling patterns includes uncolored patterns and colored patterns. In at least some embodiments, uncolored patterns are specified as a mask or stencil through which a separately specified color is painted. In at least some embodiments, all areas within the pattern are either painted with a specific combination of color space or color value(s) or are unmarked. In at least some embodiments, colored patterns are fully specified and can mark the area filled with multiple different colors, color spaces, or color values.

The use of patterns for regions that will be replaced later can be beneficial because most, or even all, document design applications (which are used to create the print job files) permit the use of patterns. In at least some embodiments, the area of the pattern can have a variety of different shapes and is not constrained to the size of a single graphic. In at least some embodiments, a pattern can be specified to automatically fill an area with replicas. However, although a pattern can be repeated multiple times, there is no requirement to repeat a pattern. Moreover, although the pattern may be repeated, in at least some embodiments, it is possible to define a replacement pattern so that only one repeat (or a limited number of repeats) are replaced if that is what is desired.

Figure 2:
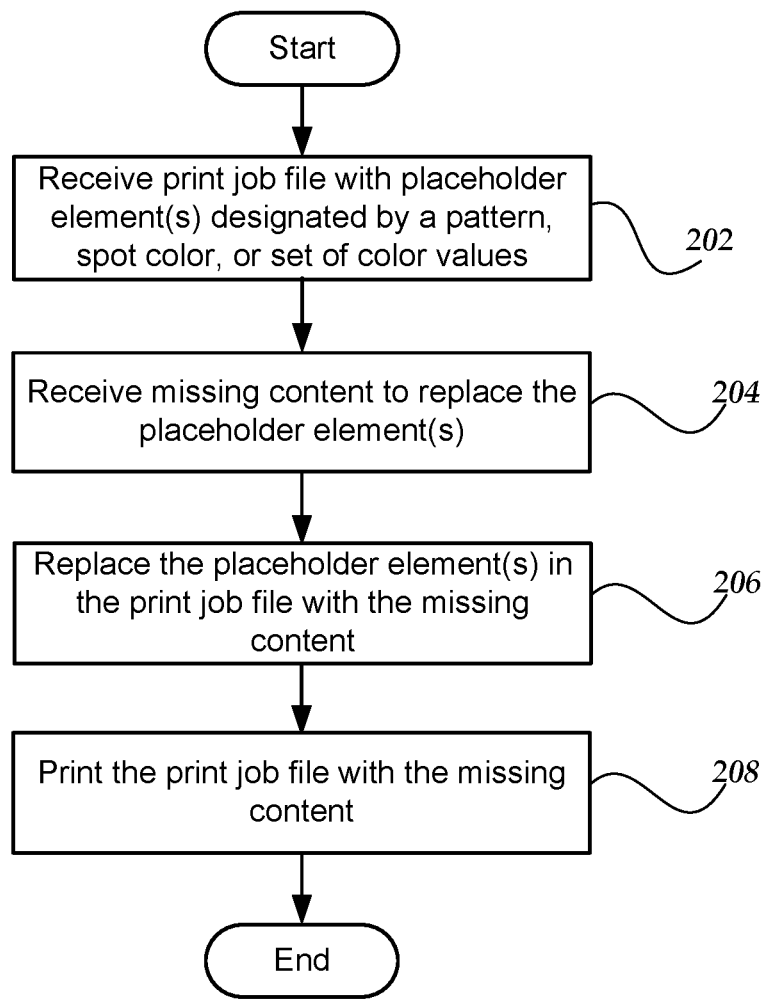
FIG. 2 is a schematic flowchart of one embodiment of a method of processing a print job file using a printing system, according to the invention.

FIG. 2 illustrates one embodiment of a method of processing and printing a print job file using a printing system. In step 202, the print job file is received by the printing system. (The terms "print job file" and "document" are used interchangeably herein except when "document" refers to the final printed product.) The print job file is produced using one or more design applications, such as a word processor, presentation creator, spreadsheet application, pdf creator, or other document creator or the like or any combination thereof.

The print job file, when received by the printing system, includes one or more placeholder elements that are placeholders for missing element(s) of the print job file. The placeholder element(s) can be, for example, an area in the print job file designated using a pattern, spot color, or predefined set of color values.

Figure 3:
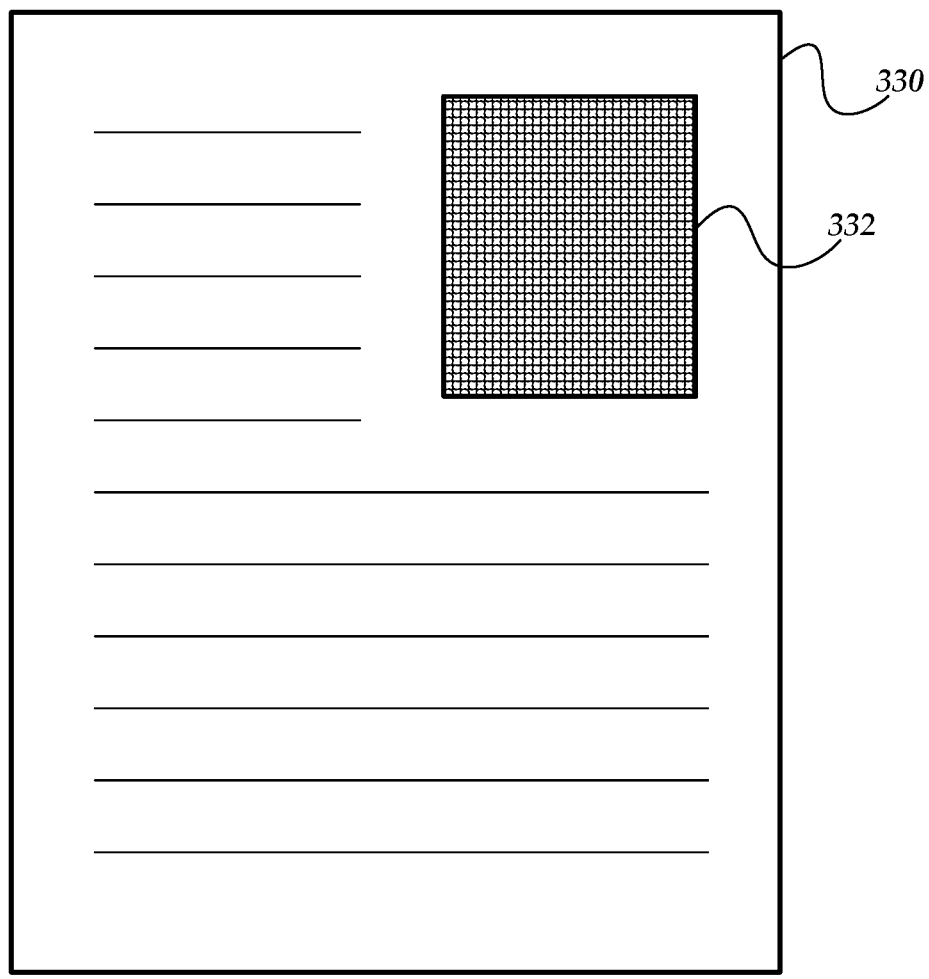
FIG. 3 is a schematic illustration of one embodiment of a page of a print job file with a placeholder element, according to the invention. #

For example, one or more areas within the document or print job file can be marked for later replacement using a pre-defined pattern; a spot color with a pre-defined name or constructed using a pre-defined naming convention; or a pre-defined set of color values in a pre-selected color space (for example, 1% Cyan, 0% Magenta, Yellow and Black) which, optionally, is not intended for actual color printing. As an example, as illustrated in FIG. 3, a sheet 330 of the print job file may have an area 332 filled with a checkerboard pattern. The replacement content, when applied to the print job file, fills that area with, for example, micro-QR codes showing the manufacturer, manufacturing location and date.

A spot color may be particularly useful for cases where the design application does not include support for patterns but does support spot colors or for print job files that are generated programmatically where marking an area with a spot color is easier than including a pattern definition. The set of pre-defined color values may be particularly useful for cases where the design application does not include support for either spot colors or patterns (many office document creation tools fall into this category.)

In at least some embodiments, the pattern, spot color, or pre-defined set of color values may be used to fill the area within a contour, to stroke a contour, or to fill an imagemask. Using a spot color could also be combined with painting a single-channel image or smooth shading.

In step 204, the missing element(s), information, or other content is received by the printing system. This missing content can be received with the document or print job file or can be received subsequent to, or prior to, receipt of the print job file. In at least some embodiments, the print job file and the missing element(s), information, or other content are received from the same source such as, for example, the same person, company, customer, vendor, or the like.

In step 206, the placeholder element(s) are replaced by the received missing content. When the print job file is sent for printing, the area(s) with the pattern, spot color, or predefined color values has been replaced with at least a portion of the missing content. The replacement may be performed at one or more of a variety of different points in the workflow of the printing system, depending, at least in part, on the printing system and software used by the printing system. The replacement occurs between receipt of the print job file by the printing system and the final delivery to the marking engine of the printer or press. As an example, in at least some embodiments of conventional printing (for example, offset lithography or flexography) the replacement may be performed at some point in a prepress workflow that leads up to plate-making or rendering in preparation for print. As another example, in at least some embodiments of digital printing (e.g., inkjet or toner printing) the replacement may be performed within the Digital Front End (DFE) of the printer or press. In at least some embodiments, within the prepress workflow or DFE the replacement is performed in a component that adjusts the print job file in preparation for RIPing (raster image processing), or the replacement is performed by the RIP (raster image processor), or the replacement is performed on an interface card used to deliver raster data to the marking engine.

In at least some embodiments, a look-up table is used to guide the replacement of the placeholder element(s) with the missing element(s). In at least some embodiments, when replacing a pattern, the look-up table may compare a variety of values to determine if a pattern should be replaced or not and, if so, with which replacement. As examples, the values may be, but are not limited to, a) a custom key within the job pattern dictionary that specifies, for example, a pattern name or customer identifier; b) one or more values within the optional XUID (extended unique ID) entry that is specified, for example, in PostScript language pattern dictionaries and may be included in a PDF pattern dictionary; or c) a hash value computed from, for example, a PostScript PaintProc procedure or the stream value of a PDF pattern definition. The pattern to be replaced may be colored or uncolored, regardless of whether the replacement content is colored or uncolored. If the replacement content is an uncolored pattern and the graphic to be replaced is painted with a colored pattern, a spot color or a nominated color space and color values, the look-up table may include the color space and color values to be used to paint through the uncolored pattern.

In at least some embodiments, when replacing a spot color, the look-up table can contain a spot color name to compare against. In at least some embodiments, the look-up table may also include flags to indicate whether the comparison should be case-sensitive or not, and whether any transform into a canonically case-folded representation (e.g., in UTF-8) should be performed to ensure that different encoding of non-ASCII characters in the spot name does not prevent replacement. In at least some embodiments, the spot color name to compare against may be required to match the whole of the spot color name used in the job or may only be required to match a part of the job spot color name, for example, the start of the job spot name.

In at least some embodiments, when replacing a predefined color space and color values, the look-up table may include the specified color space and color values. In at least some embodiments, the look-up table may also include an accuracy threshold. This may be used because some design applications present color values in CMYK as percentage values, but internally, and in the PostScript and PDF files they create, represent those as the nearest multiple of ¹⁄₂₅₅. Thus, requesting a 50% tint in one channel will often result in the job asking for a value of 0.498 in that channel.

In step 208, the print job file is printed by the printing system with the missing content.

The methods, systems, and devices described above include replacing a pattern, spot or nominated set of color values with a pattern that makes use of information available in the prepress workflow or DFE.

In at least some embodiments, an approach can be used, for example, using elements of the print job file to manage replacement. In the PostScript language each tiling pattern includes an executable procedure called the PaintProc. This procedure (or any additional procedures that are called, directly or indirectly, by it) can assess the environment in which they are running, and can do different things depending on that assessment.

As an example, a PaintProc procedure determines whether the procedure is being executed in a production workflow by testing to see if it is being run within a RIP and at a resolution of 300 dpi or greater. The printing system shows one set of data for a non-production environment, but a different, dynamic, set of data in a production environment.

As an example, the PaintProc procedure in the code below will call one of ProductionPattern or ThumbnailPattern, depending on whether the code is run in a RIP and at 300 dpi or higher. The ProductionPattern and ThumbnailPattern procedures would paint the pattern required in each case. The ProductionPattern is the missing content that can be supplied separate from the print job file (see step 204 of FIG. 2).

In this example the current rendering resolution is captured early because it may not be accessible during execution of the PaintProc itself.

```
userdict/currentresolution currentpagedevice/HWResolution get 0 get put
/PatternType 1 % tiling pattern
/BBox [ 0 0 288 288] % 4" square
/XStep 288
/YStep 288
/PaintType 1 % colored tiling pattern
/TilingType 1 % constant spacing of tiles
/PaintProc {
/hqnversion where {pop true} {false} ifelse
//currentresolution 300 ge and {
  % production printing
  ProductionPattern
} {
  % thumbnail generation or not in a RIP
  ThumbnailPattern
} ifelse
} bind
/ProductionPattern {
% the dynamically generated pattern definition
% would be here
} bind
/ThumbnailPattern {
% The static pattern to be used for thumbnails
% would be here
} bind
>> matrix makepattern setpattern
0 0 600 600 rectfill
showpage
```

It will be understood that each block of the flowchart illustrations, and combinations of blocks in the flowchart illustrations and methods disclosed herein, can be implemented by computer program instructions. These program instructions may be provided to a processor to produce a machine, such that the instructions, which execute on the processor, create means for implementing the actions specified in the flowchart block or blocks disclosed herein. The computer program instructions may be executed by a processor to cause a series of operational steps to be performed by the processor to produce a computer implemented process. The computer program instructions may also cause at least some of the operational steps to be performed in parallel. Moreover, some of the steps may also be performed across more than one processor, such as might arise in a multi-processor computer system. In addition, one or more processes may also be performed concurrently with other processes, or even in a different sequence than illustrated without departing from the scope or spirit of the invention.

The computer program instructions can be stored on any suitable computer-readable medium including, but not limited to, RAM, ROM, EEPROM, flash memory or other memory technology, CD-ROM, digital versatile disks ("DVD") or other optical storage, magnetic cassettes, magnetic tape, magnetic disk storage or other magnetic storage devices, "in the cloud", or any other medium which can be used to store the desired information and which can be accessed by a computer.

The above specification provides a description of the manufacture and use of the invention. Since many embodiments of the invention can be made without departing from the spirit and scope of the invention, the invention also resides in the claims hereinafter appended.

What is claimed as new and desired to be protected by Letters Patent of the United States is:

1. A method for processing a print job file using a printing system, the method comprising:
   receiving, by the printing system from a source, the print job file, the print job file comprising at least one placeholder element designated in the print job file using a pattern, a spot color, or a set of color values;
   receiving, by the printing system from the source, missing content for the print job file;
   replacing, by the printing system, the at least one placeholder element with the missing content; and
   printing, by the printing system, the print job file including the missing content.

2. The method of claim 1, wherein at least one of the at least one placeholder element is designated in the print job file using the pattern and the pattern is a shading pattern or a tiling pattern.

3. The method of claim 1, wherein at least one of the at least one placeholder element is designated in the print job file using the spot color and the spot color has a predefined name or a name constructed using a predefined naming convention.

4. The method of claim 1, wherein at least one of the at least one placeholder element is designated in the print job file using the set of color values which are not intended for printing as a color.

5. The method of claim 1, wherein replacing the at least one placeholder element comprises replacing the at least one placeholder element in a prepress workflow prior to rendering in preparation for print.

6. The method of claim 1, wherein replacing the at least one placeholder element comprises replacing the at least one placeholder element by a Digital Front End of the printing system.

7. The method of claim 1, wherein replacing the at least one placeholder element comprises replacing the at least one placeholder element by a Raster Image Processor of the printing system.

8. The method of claim 1, wherein replacing the at least one placeholder element comprises replacing the at least one placeholder element by supplying the missing content as a production pattern to be accessed by a procedure in the print job file.

9. The method of claim 8, wherein the procedure is a PaintProc procedure.

10. A printing system for processing a print job file, the printing system comprising:
   a printing device; and
   at least one processor coupled to the printing device and configured and arranged to perform actions, the actions comprising:
      receiving, by the at least one processor from a source, the print job file, the print job file comprising at least one placeholder element designated in the print job file using a pattern, a spot color, or a set of color values;
      receiving, by the at least one processor from the source, missing content for the print job file;
      replacing, by the at least one processor, the at least one placeholder element with the missing content; and
      printing, by the printing device, the print job file including the missing content.

11. The printing system of claim 10, wherein at least one of the at least one placeholder element is the pattern and the pattern is a shading pattern, a tiling pattern, or a thumbnail pattern.

12. The printing system of claim 10, wherein at least one of the at least one placeholder element is the spot color and the spot color has a predefined name or a name constructed using a predefined naming convention.

13. The printing system of claim 10, wherein at least one of the at least one placeholder element is the set of color values which are not intended for printing as a color.

14. The printing system of claim 10, wherein replacing the at least one placeholder element comprises replacing the at least one placeholder element in a prepress workflow prior to plate-forming.

15. The printing system of claim 10, wherein replacing the at least one placeholder element comprises replacing the at least one placeholder element by a Digital Front End of the printing device.

16. A non-transitory computer-readable medium having processor-executable instructions for processing a print job file using a printing system, the processor-executable instructions when installed onto a device enable the device to perform actions, the actions comprising:
   receiving, by the printing system from a source, the print job file, the print job file comprising at least one placeholder element designated in the print job file using a pattern, a spot color, or a set of color values;
   receiving, by the printing system from the source, missing content for the print job file;
   replacing, by the printing system, the at least one placeholder element with the missing content; and
   printing, by the printing system, the print job file including the missing content.

17. The non-transitory computer-readable medium of claim 16, wherein at least one of the at least one placeholder element is the pattern and the pattern is a shading pattern, a tiling pattern, or a thumbnail pattern.

18. The non-transitory computer-readable medium of claim 16, wherein at least one of the at least one placeholder element is the spot color and the spot color has a predefined name or a name constructed using a predefined naming convention.

19. The non-transitory computer-readable medium of claim 16, wherein at least one of the at least one placeholder element is the set of color values which are not intended for printing as a color.

20. The non-transitory computer-readable medium of claim 16, wherein replacing the at least one placeholder element comprises replacing the at least one placeholder element by a Digital Front End of the printing system.

* * * * *